Sept. 20, 1927.  T. J. SCHUETZ  1,642,898
BRAKING MECHANISM FOR MOTOR VEHICLES
Filed Aug. 24, 1926   3 Sheets-Sheet 2
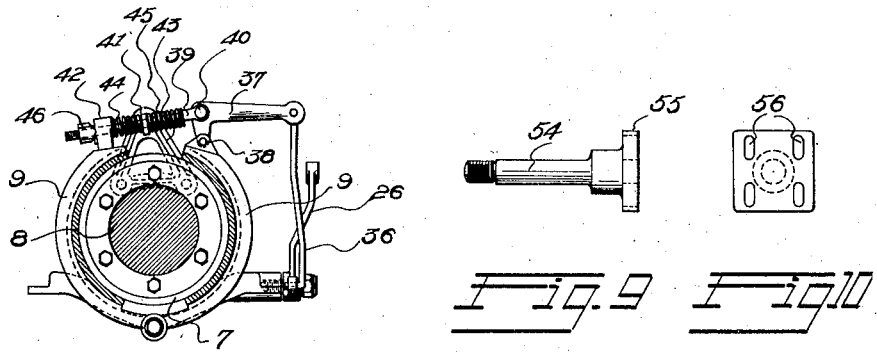
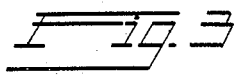
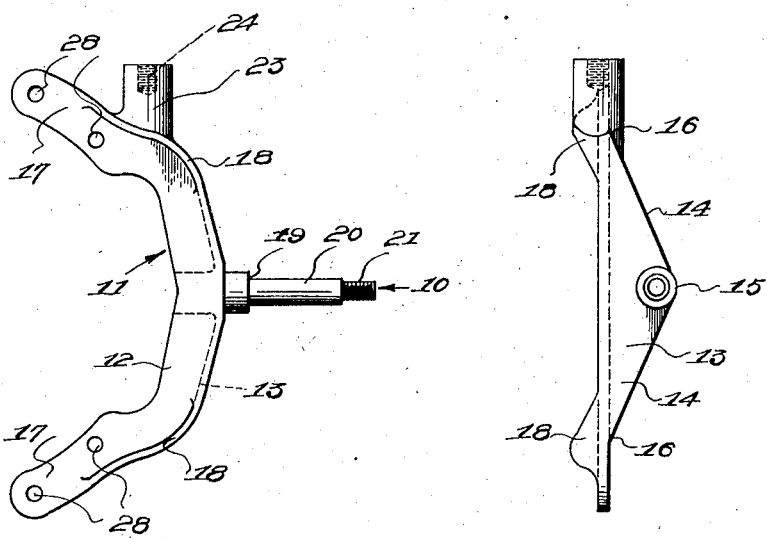
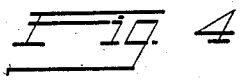

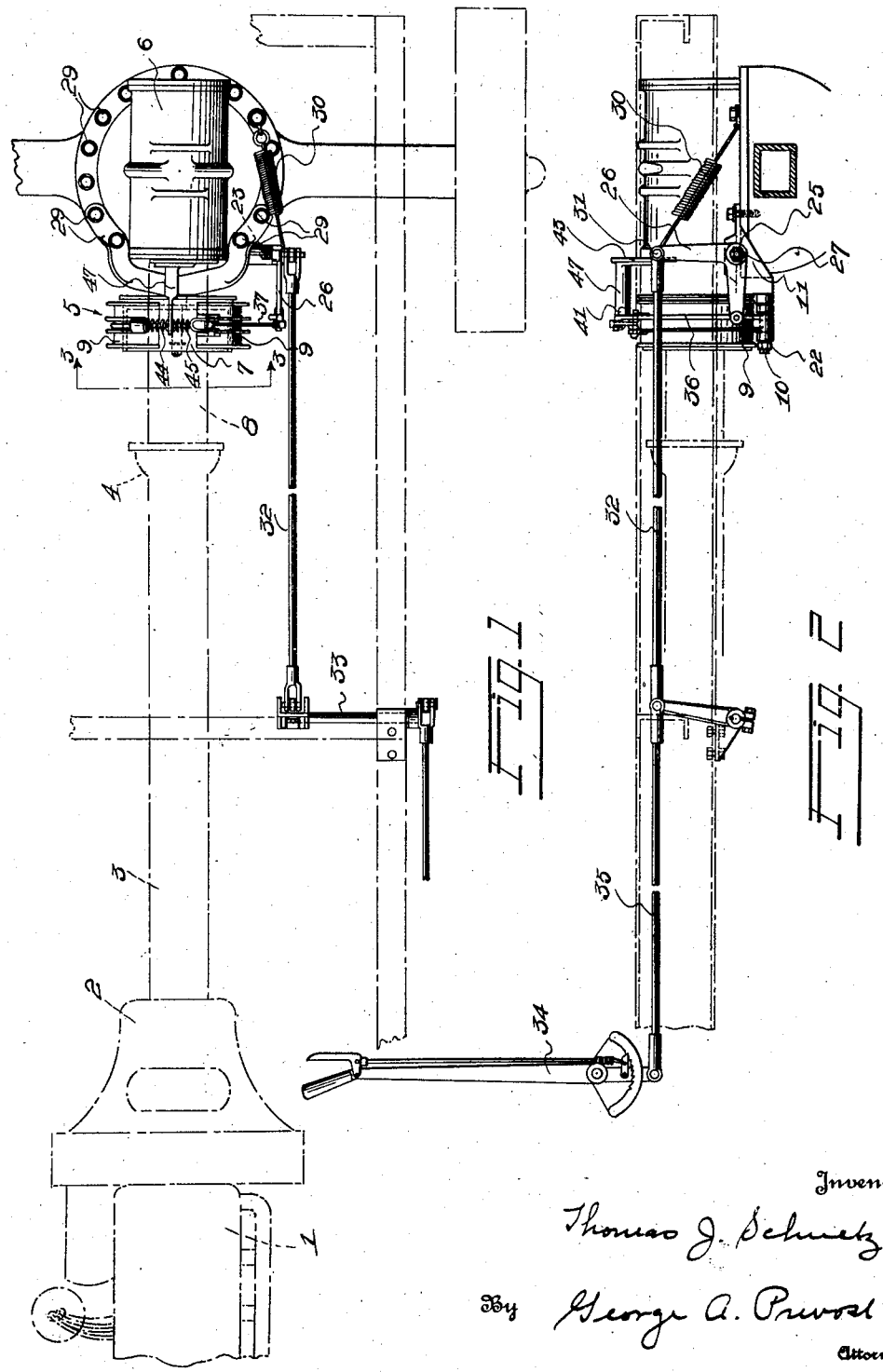

Sept. 20, 1927.  1,642,898
T. J. SCHUETZ
BRAKING MECHANISM FOR MOTOR VEHICLES
Filed Aug. 24, 1926   3 Sheets-Sheet 3
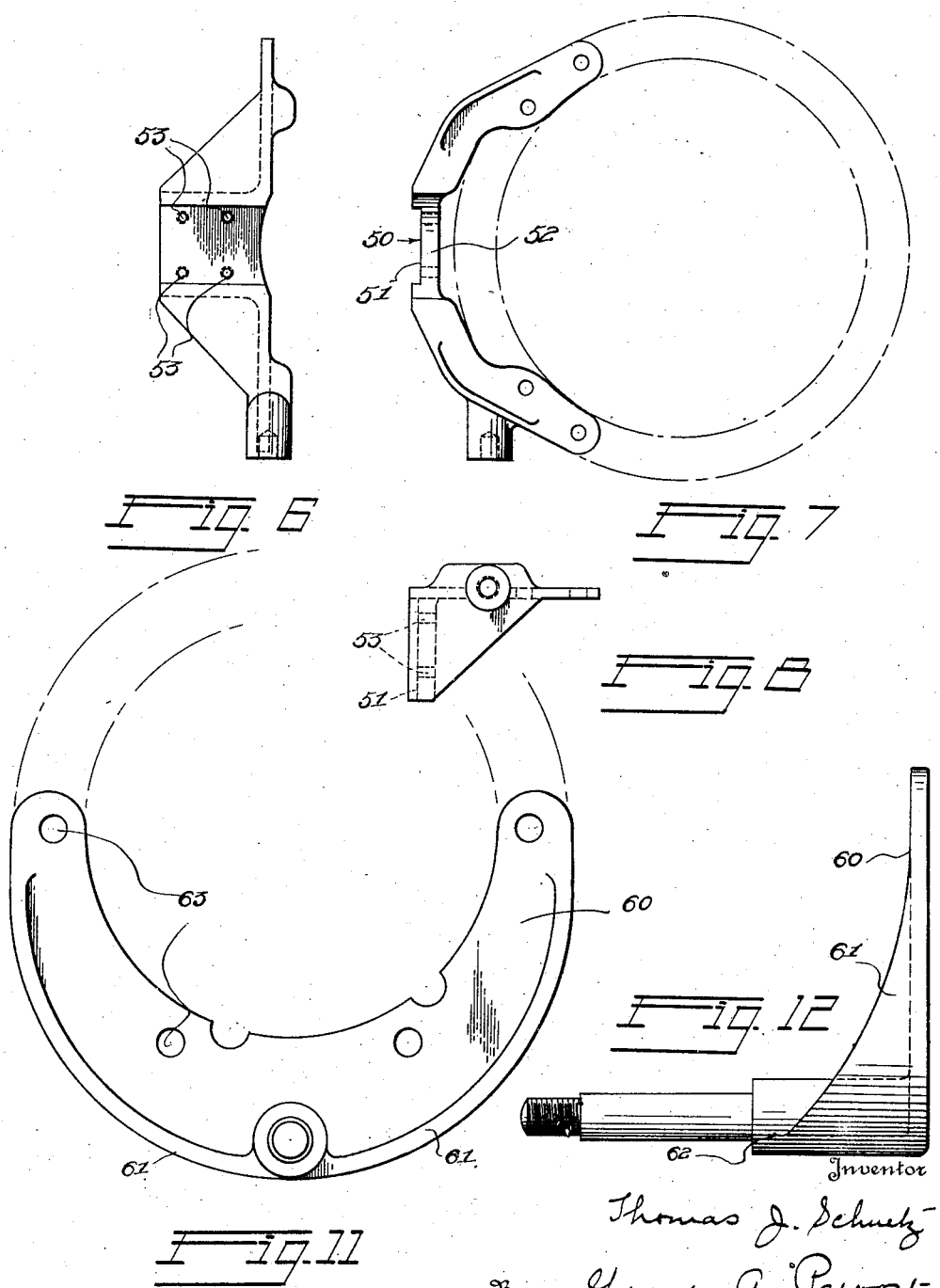

Patented Sept. 20, 1927.

1,642,898

UNITED STATES PATENT OFFICE.

THOMAS J. SCHUETZ, OF TULSA, OKLAHOMA.

BRAKING MECHANISM FOR MOTOR VEHICLES.

Application filed August 24, 1926. Serial No. 131,210.

This invention relates to motor vehicle brakes, and particularly to brakes of the character employed on the shafting between the transmission and differential mechanisms.

The primary object of the invention is to provide a bracket of novel and special design to be used with such brakes; this bracket to be bolted to the rear axle housings and supporting the brake shoes in such manner as to permit them to be brought into frictional contact with a brake drum mounted on said shafting. This bracket carries the brake shoes in a position behind one or more universal joints which are required in the drive shafting, and the brake shoes thus eliminate back lash on the universal joint and the propeller shaft, as well as on all connections between the final universal joint and the power source.

A further object is to furnish a bracket of this character which includes a pivot pin mounting for a bell-crank used in changing the direction of the pull power at an angle of 90°, or any suitable angle, obtuse or acute, from the basic 90° angle within reasonable limits.

Another object is to provide a bracket of this character designed to be applied to the rear axle housing by the same screws employed to secure the cover of the axle housing in position.

The invention also includes modifications of this bracket, one form of which is adapted to be attached to a horizontal surface and is provided with an adjustable pivot pin for the brake shoes; and another form of which is adapted to be attached to a vertical surface.

With the foregoing objects outlined, and with other objects in view which will appear as the description proceeds, the invention consists in the novel features hereinafter described in detail, illustrated in the accompanying drawings, and more particularly pointed out in the appended claims.

Referring to the drawings:

Fig. 1 is a top plan view of my improved brake and the preferred form of mounting bracket shown applied to a motor vehicle, parts of which are in dotted lines.

Fig. 2 is a side view of the same.

Fig. 3 is an end view looking in the direction of the arrow line in Fig. 1.

Fig. 4 is a top plan view of the preferred form of mounting bracket.

Fig. 5 is a front view of said bracket.

Figs. 6, 7 and 8 are respectively, front, top and side views of a modified form of bracket with its pivot pin detached.

Figs. 9 and 10 are side and rear end views of the pivot pin used with the type of brackets shown in Figs. 6 to 8 inclusive.

Figs. 11 and 12 are front and side views of a further modification of the bracket.

In the embodiment of the invention illustrated in Figs. 1 to 5 inclusive, 1 indicates a motor vehicle engine, 2 the transmission casing, and 3 the propeller shaft. It is usual in motor vehicles, to employ one or more universal joints in the shafting between the transmission and the differential, and I have illustrated one of these joints in Fig. 1, and marked the same 4. The improved brake mechanism 5, is arranged rearwardly of the universal joint, and directly in front of the differential casing of rear axle housing 6.

A brake drum 7 forming part of this invention, is fixed to the pinion or worm shaft 8, and cooperates with brake shoes 9, which have their lower ends pivotally mounted on a pin 10, forming part of my special bracket 11.

This bracket is more clearly illustrated in Figs. 4 and 5, and from these views, it may be seen that it consists of a substantially arc-shaped horizontal member 12, provided with a depending flange 13, having appositely inclined edges 14 which extend from a point 15 to points 16, and there merge into the rearwardly extending arms 17 of the bracket.

A pair of upwardly extending spaced flanges 18 overlap the points where the arms 17 join the main body of the bracket. These webs or flanges 13 and 18 are for the purpose of imparting strength at such points and locations where the braking stress is centralized, and at such points about which the moment of the braking forces act.

The pivot pin 10 for the brake shoes, is integral with the depending web 13 and is provided with a shoulder 19, a cylindrical portion 20 and a threaded portion 21. The lower parts of the brake shoes oscillate on the cylindrical part 20 and they abut against the shoulder 19 which holds them in spaced relation from the bracket. The brake shoes may be readily placed on or removed from the pin 10, and they are locked in position thereon by a nut 22 which engages the threaded part 21.

Extending laterally from the bracket 11 is a cylindrical boss 23 having a threaded aperture 24, the latter being adapted to receive the inner threaded portion of a pin 25 which functions as a mounting for a bell crank lever 26. The pin 25 is arranged at right angles to the shafting and carries a nut 27 which secures the bell crank in position.

The arms 17 of the bracket have apertures 28 to receive screws 29 employed in securing the brackets to the rear axle housing. The holes 28 are spaced to correspond with the screw holes in the cover of the axle housing, so that the bracket may be secured in place by four of the screws employed to hold the axle housing cover in position. I prefer to rigidly mount the bracket in this manner, but of course, equivalent means may be employed if desired.

I also make use of another one of the cover screws to secure the rear end of a spring 30 to the axle housing, the forward end of this spring being connected to a pin 31 on the upper arm of the bell crank lever 26. An operating rod 32 extends forwardly from this bell crank and is secured to the latter, and the front end of said rod is connected to a rock shaft 33 that may be actuated from a control lever 34 by means of a link 35.

As best shown in Fig. 3, the lower arm of the bell crank lever is connected by a substantially vertical link 36 to the long arm of another bell crank lever 37. The short arm of this bell crank lever is connected at 38 to the upper end of one of the brake shoes 9. A rod 39 is pivotally connected at 40 to the elbow of the bell crank 37, and this rod passes through eyes 41 and 42 fixed respectively on an auxiliary bracket 43 and the opposite brake shoe 9. Springs 44 and 45 are arranged on this rod, and the spring 44 bears against the eyelets 41 and 42, while the spring 45 bears against the eyelet 41 and a shoulder on the rod. Due to this construction, the springs tend to move the upper ends of the brake shoes apart, so as to normally hold the shoes out of contact with the brake drum 7. An adjusting nut 46 is arranged on a threaded end of the rod for varying the tension of the spring.

The auxiliary bracket 43 is preferably of triangular shape and is secured to the front of the axle housing 6, and this auxiliary bracket has a forwardly extending pin 47 which carries the eyelet 41.

From the foregoing description, it will be understood that the brake shoes are normally held out of contact with the brake drum by means of the springs 44 and 45, but as soon as the lever 34 is moved in a clockwise direction, the rods 35 and 32 will be drawn forwardly, the bell crank lever 26 will be swung in a counter-clockwise direction, the link 36 will be drawn downwardly, and as a result, the upper ends of the brake shoes will be forced toward each other, and the shoes will grip the drum.

As soon as the lever 34 is released, the spring 30 will draw the rods 32 and 35 rearwardly, and will turn the lever 34 to its normal position, and the springs 44 and 45 will return the brake shoes to normal position.

As stated above, one of the essential features of this construction, is the bracket 11 which not only provides a sturdy mounting for the brake shoes on the rear axle housing, but also furnishes a mounting means for the bell crank 26.

The bracket shown in Figs. 6 to 10 inclusive, is quite similar to the one just described, and is adapted to be mounted on a horizontal surface, such as the upper surface of a rear axle housing. In this instance however, the front portion of the casting is provided with a guideway 50 having a vertical surface 51 formed by a straight web 52, the latter having bolt holes 53. The brake shoe pivot pin, in this case, is made separately, and is adjustably secured in position by bolts or screws. The pivot pin is shown in Figs. 9 and 10 and is marked 54. It is provided at its rear end with an enlarged head 55, having vertical slots 56 which are designed to register with the holes 53 and receive the bolts or screws employed in adjustably securing the parts in position. The head 55 of the pin, of course, slides in the guideway 50, and this construction permits me to take care of variations in the height of the axle housing of different machines. This means of adjusting, allows me to vary the height of the pivot pin without shimming up or cutting down the mounting surface on the axle housing.

The bracket shown in Figs. 11 and 12 is a metal fixture designed for vertical mounting to rear axle housings of motor driven vehicles, in such a way as to permit mounting of friction brakes on the pinion or worm shafts, in a position located between the propeller shaft and the universal joint companion flange. It is so constructed and designed to incorporate the pivot pin located at a given radius, which may suit the particular requirement of the motor vehicle upon which it is applied. Incorporated in this fixture 60, will be found reinforcing webs 61 which extend from points near the ends of the fixture to a pin boss 62 arranged at the bottom of the fixture. These webs are arranged at the points about which the moment of braking forces act, insuring rigidity in a given location. The vertical part of this bracket has horizontally arranged holes 63 to receive the bolts or screws employed in securing it to the front face of rear axle housings of certain constructions.

The particular and principal advantage of each of the three brackets heretofore mentioned, is that it permits the location of the friction brake between one or more universal joints on the power shafting, and the pinion or worm shaft which extends into the rear axle housing, thus eliminating braking shock to such universal joint and the propeller shaft proper, and confines such braking to the point as near the power angle as it has been possible to arrive.

My construction and arrangement also has the advantage of permitting brake mounting at a point where radiation of heat generated by braking pressure is carried off by the rush of air which is not hindered or obstructed by any part of the motor vehicle while the latter is in motion, and, unlike brakes in any other location on the motor vehicle, is exposed to the air velocity in proportion to the speed of the motor vehicle, without obstruction and without retarding radiation of generated heat.

From the foregoing, it is believed that the construction, operation and advantages of the invention may be readily understood, and it is apparent that changes may be made in the details disclosed without departing from the spirit of the invention as expressed in the claims.

What I claim and desire to secure by Letters Patent is:

1. In a motor vehicle, a rear axle housing, a gear shaft projecting forwardly from said housing, a propeller shaft, a universal joint connecting said shafts, a brake drum fixed to the gear shaft and arranged rearwardly of said universal joint, a bracket fixed to the rear axle housing and provided with a pivot pin, brake shoes cooperating with said drum and pivotally mounted on said pin, and manumotive means for manipulating said brake shoes, said bracket being of substantially arc-shape with the pivot pin arranged at its central portion, and being provided with integral reinforcing flanges.

2. In a motor vehicle, a rear axle housing, a gear shaft projecting forwardly from said housing, a propeller shaft, a universal joint connecting said shafts, a brake drum fixed to the gear shaft and arranged rearwardly of said universal joint, a bracket fixed to the rear axle housing and provided with a pivot pin, brake shoes cooperating with said drum and pivotally mounted on said pin, and manumotive means for manipulating said brake shoes, the bracket having a boss extending outwardly at an angle to said pivot pin, and the manumotive means including a bell-crank pivotally mounted on said boss.

3. A bracket for use in securing a brake to the rear axle of a motor vehicle, comprising a substantially arc-shaped body portion having a plane surface adapted to abut against an axle housing, and to be secured to the latter, a pivot pin projecting from the central portion of said bracket, and reenforcing webs extending from the pivot pin towards the ends of the bracket, said pivot pin being vertically adjustably mounted on the body of the bracket.

4. A bracket for use in securing a brake to the rear axle of a motor vehicle, comprising a substantially arc-shaped body portion having a plane surface adapted to abut against an axle housing, and to be secured to the latter, the front of the body portion being provided with a guideway, a pivot pin projecting from the central portion of said bracket, and having a head slidably mounted in said guideway, and reenforcing webs extending from the pivot pin towards the ends of the bracket.

5. In a motor vehicle, a rear axle housing, a gear shaft projecting forwardly from said housing, a propeller shaft, a universal joint connecting said shafts, a brake drum fixed to the gear shaft and arranged rearwardly of said universal joint, a substantially arc-shaped bracket fixed to the rear axle housing, and provided at its central portion with a forwardly projecting pivot pin, brake shoes cooperating with said drum and pivotally mounted on said pin, and manu-motive means for manipulating said brake shoes.

6. In motor vehicle braking mechanism, a substantially arc-shaped bracket including an apertured body having a plane surface adapted to abut against an axle housing, and to be secured to the latter, a pivot pin integral with said bracket and projecting forwardly from the central portion of said body, and reenforcing flanges integral with the pin and body, and extending from said pivot pin towards the ends of the bracket.

7. In motor vehicle braking mechanism, a bracket of substantially arc-shaped form in plan, and including a body having a horizontally disposed plane surface adapted to abut against an axle housing, and to be secured to the latter, a pivot pin rigidly united with the bracket and projecting horizontally from the central portion of said body, and reenforcing flanges extending from the pivot pin towards the ends of the bracket.

8. A bracket for use in securing a brake to the rear axle housing of a motor vehicle, comprising a substantially arc-shaped portion having a plane surface adapted to abut against an axle housing, and to be secured to the latter, a pivot pin projecting forwardly from the central portion of said bracket, reenforcing webs extending from the pivot pin towards the ends of the bracket, and a pivot pin boss projecting from the bracket and arranged at an angle to the first mentioned pivot pin.

9. In a motor vehicle, a rear axle housing, a gear shaft projecting forwardly from said housing, a propeller shaft, a universal joint connecting said shafts, a brake drum fixed to the gear shaft and arranged rearwardly of said universal joint, a bracket detachably connected to the rear axle housing and provided with a pivot pin, brake shoes arranged exteriorly of and cooperating with said drum and pivotally mounted on said pin, and manumotive means for manipulating said brake shoes, said manumotive means including a bell-crank lever having a pivot pin arranged at an angle to said shafts and carried by said bracket.

In testimony whereof I affix my signature.

THOMAS J. SCHUETZ.